United States Patent [19]

Hashimoto

[11] Patent Number: 5,501,765
[45] Date of Patent: Mar. 26, 1996

[54] HEAT-SEALING APPARATUS

[75] Inventor: Yasuo Hashimoto, Toyonaka, Japan

[73] Assignee: Fuji Impulse Co., Ltd., Japan

[21] Appl. No.: 317,322

[22] Filed: Oct. 4, 1994

[30] Foreign Application Priority Data

Dec. 28, 1993 [JP] Japan .................................. 5-334636

[51] Int. Cl.⁶ .............................. B30B 5/02; B30B 15/34
[52] U.S. Cl. ...................... 156/583.3; 156/583.8; 100/93 R; 100/210; 100/233; 412/33; 412/902
[58] Field of Search ..................... 156/582, 583.1, 156/583.3, 583.4, 583.8, 583.6, 583.9, 583.91; 100/92, 210, 93 R, 233; 412/33, 37, 900, 901, 902

[56] References Cited

U.S. PATENT DOCUMENTS

| | | | |
|---|---|---|---|
| 3,375,777 | 4/1968 | Techtmann et al. | 156/583.8 X |
| 3,830,681 | 8/1974 | Wilson | 156/583.9 X |
| 4,067,761 | 1/1978 | Shirley | 156/218 |
| 4,084,999 | 4/1978 | Rucker | 156/466 |
| 4,386,993 | 6/1983 | Matsuo | 156/358 |
| 4,441,953 | 4/1984 | Hollinger, Jr. | 156/290 |
| 4,551,965 | 11/1985 | Prottengeier | 156/583.3 X |
| 5,112,209 | 5/1992 | Ahrweiler et al. | 425/371 |

FOREIGN PATENT DOCUMENTS 3133721  6/1991  Japan .

*Primary Examiner*—David A. Simmons
*Assistant Examiner*—J. Sells
*Attorney, Agent, or Firm*—Webb Ziesenheim Bruening Logsdon Orkin & Hanson

[57] ABSTRACT

A heat-sealing apparatus includes a casing, a pair of lower and upper binding members for vertically binding a portion of a heat-fusible wrapper therebetween, a heater attached to a binding face of the lower binding member which is in turn fixed to the casing. The heater is operable to heat-fuse the portion of the wrapper. The apparatus further includes a switching mechanism for switching over the upper binding member between a binding position where the upper binding member is pressed against the binding face of the lower binding member and a releasing position where the upper binding member is retracted in an upper-rear direction away from the binding face of the lower binding member. The upper binding member is a heat-resistant elastic pressing roller rotatable about an axis extending along a length of the heater.

10 Claims, 4 Drawing Sheets

HEAT-SEALING APPARATUS

BACKGROUND OF THE INVENTION

1. Field of the Invention

The present invention relates to a heat-sealing apparatus, and more particularly to a heat-sealing apparatus used for heat-fusing a portion to be sealed of a heat-fusible wrapper of e.g. vinyl chloride film, polyethylene film or the like.

2. Description of the Related Art

A conventional heat-sealing apparatus of the above-noted type includes a pair of binding members for vertically binding the portion of the heat-fusible wrapper therebetween. Of these binding members, to a binding face of the lower binding member which is fixed to a casing, there is mounted a heater for heat-fusing the portion of the wrapper to be sealed. On the other than, to a corresponding binding face of the upper binding member, there is affixed a heat-resistant elastic plate-like pressing member along the length of the heater. The apparatus further includes a switching mechanism for switching over the upper binding member between a binding position and a releasing position substantially vertically away from the binding face of the lower binding member (see Japanese laid-open patent gazette Hei. 3-133721, for example).

According to the above-described conventional heat-sealing apparatus, for a heat-sealing operation, the upper binding member is moved substantially vertically toward the binding face of the lower binding member to eventually come into contact with the same, such that an unpleasant binding noise is generated.

Moreover, since the invariably same portion of the elastic pressing member is subjected to the repeated contact with the heater provided in the binding face of the lower binding member, local concentration of damage at this particular portion of the elastic pressing member tends to occur soon.

The present invention addresses to the above problems. A primary object of the present invention is to provide an improved heat-sealing apparatus which can restrict generation of unpleasant binding noise and improve the durability of the elastic pressing roller while heat-fusing a portion of the wrapper in a reliable manner.

SUMMARY OF THE INVENTION

For fulfilling the above-noted object, a heat-sealing apparatus, according to the present invention, comprises:

a casing;

a pair of lower and upper binding members for vertically binding a portion of a heat-fusible wrapper therebetween;

heater means attached to a binding face of the lower binding member which is in turn fixed to said casing, the heater means being operable to heat-fuse said portion of the wrapper; and a switching mechanism for switching over said upper binding member between a binding position where said upper binding member is pressed against the binding face of said lower binding member and a releasing position where said upper binding member is retracted in an upper-rear direction away from the binding face of said lower binding member;

wherein said upper binding member comprises a heat-resistant elastic pressing roller rotatable about an axis extending along a length of said heater means.

With the above construction, the elastic pressing roller is capable of rotating about the axis extending along the length of the heater means, thereby to vary a portion thereof which is to contact the heater means attached to the binding face of the lower binding member. Hence, local concentration of the damage in the elastic pressing roller may be effectively avoided.

In addition, as the contact between the roller and the binding face of the lower binding member proceeds, the condition of this contact changes from a line contact to a face contact, and this change in the contact condition serves to allow smooth escape of air which may be present between the roller and the face.

Consequently, the invention has achieved its object of providing an improved heat-sealing apparatus which can restrict generation of unpleasant binding noise and improve the durability of the elastic pressing roller while heat-fusing a portion of the wrapper in a reliable manner.

Further and other objects, features and effects of the invention will become more apparent from the following more detailed description of the embodiments of the invention with reference to the accompanying drawings.

BRIEF DESCRIPTION OF THE DRAWINGS

Accompanying drawings illustrate preferred embodiments of a heat-sealing apparatus relating to the present invention; in which.

DESCRIPTION OF THE PREFERRED EMBODIMENTS

Figure 1:
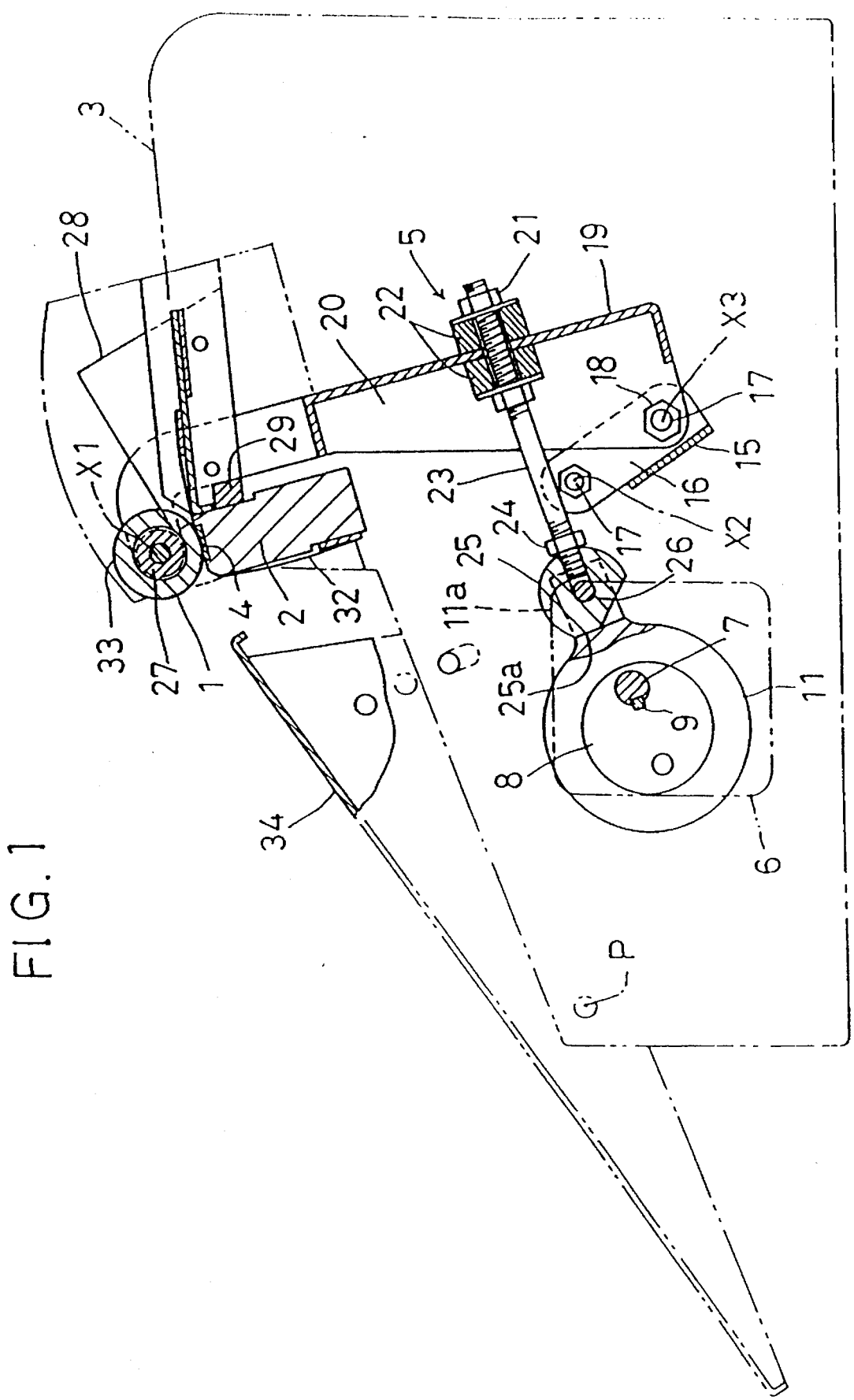
FIG. 1 is a partially cutaway section view showing an entire heat-sealing apparatus according to an embodiment.

Preferred embodiments of a heat-sealing apparatus relating to the present invention will be described in details with reference to the accompanying drawings.

One embodiment of the heat-sealing apparatus is shown in FIGS. 1–6. This heat-sealing apparatus includes a pair of binding members 1, 2 for vertically binding therebetween a portion (a) to be sealed of a heat-fusible wrapper (A) of e.g. vinyl chloride film, polyethylene film, polypropylene or the like. The lower binding member 2, which is made of an aluminum alloy, is fixed to a casing 3; and to a binding face of this lower binding member 2, there is attached a heater 4 as heater means for heat-fusing the portion (a) of the wrapper (A) bound between the binding members 1, 2 by means of heat generated in association with supply of electric power thereto. The upper binding member 1 comprises a heat-resistant elastic pressing roller made of e.g. silicon rubber material and this roller is rotatable about a first transverse axis X1 extending along a length of the heater 4. The apparatus further includes a switching mechanism 5 for switching over the elastic pressing roller 1 between a binding position where the roller 1 is pressed against the binding face of the lower binding member 2 and a non-hiding releasing position where the roller 1 is moved and retained in a rear upper direction away from the binding face of the lower binding member 2.

This switching mechanism 5 will be more particularly described next.

Figure 2:
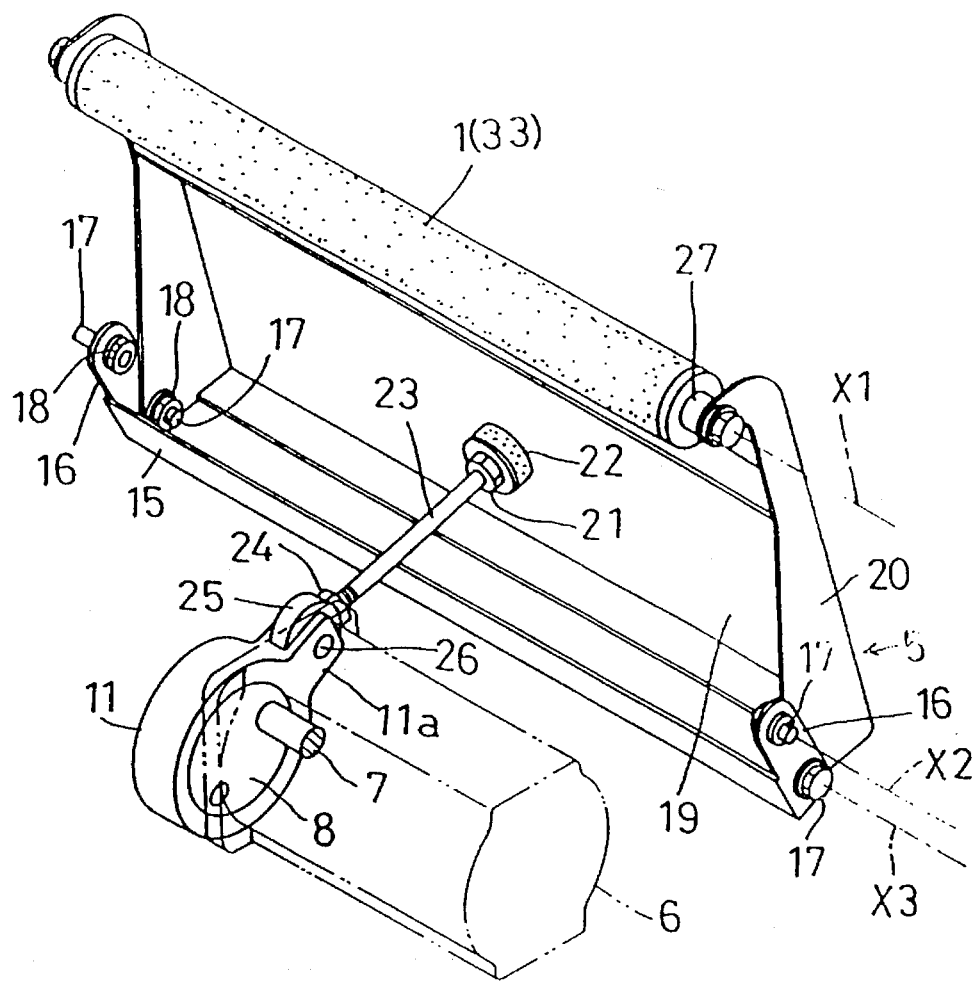
FIG. 2 is a perspective view showing a switching mechanism relating to the embodiment of FIG. 1.
Figure 3:
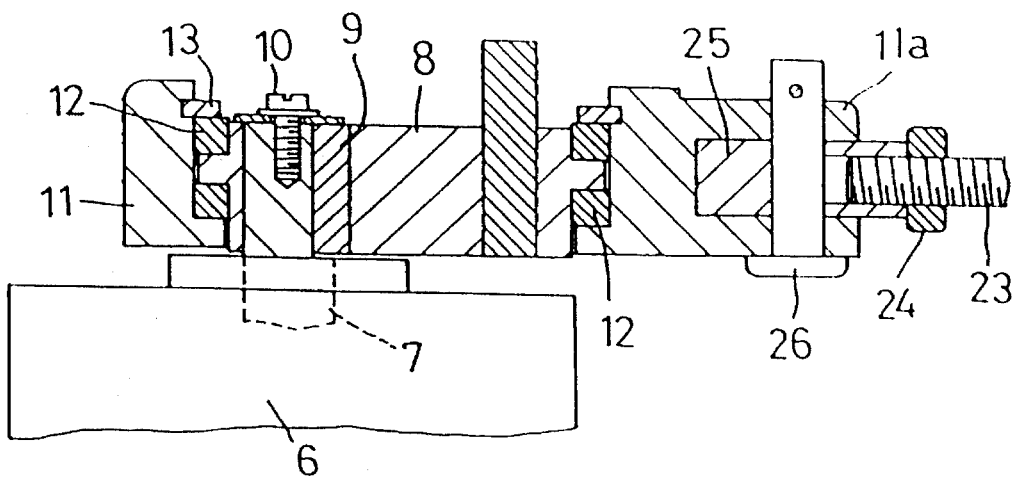
FIG. 3 is an enlarged section view of an eccentric cam relating to the embodiment of FIG. 1.

As shown in FIGS. 1–3, an output shaft 7 of an electric motor 6 (having a reduction mechanism) as driving means disposed in the casing 3 fixedly mounts, via a key 9 and a bolt 10, an eccentric cam 8 capable of eccentric rotation about a rotation axis of this output shaft 7. On an outer periphery of the eccentric cam 8, there is rotatably mounted, via a resin bush 12 and a 'C'-ring 13, a cam follower 11 operable to convert a rotary movement of the eccentric cam 8 into a reciprocal movement.

As shown in FIGS. 1 and 2, to opposed right and left walls of the casing 3, upper ends of link elements 16 connected respectively with right and left ends of a first bridge plate 15 are attached by means of bolts 17 and the like in such a manner that these link elements 16 are pivotable about a second transverse axis X2 extending parallel with the afore-mentioned first transverse axis X1. These link members 16 are connected, at respective lower ends thereof, with lower ends of arms 20 attached to right and left sides of a second bridge plate 9 having substantially 'C'-like shape by means of further bolts 17 and nuts 18 in such a manner that the arms 20 are pivotable relative to the link members 16 about a third transverse axis X3 extending parallel with the second transverse axis X2.

As shown in FIG. 1, to the second bridge plate 19, there is attached, via two bolts 21 and two pressure-accumulator elastic cylinder members 22, one terminal end of a connector rod 23. On the other terminal end of this connector rod 23, there is fixedly threaded a connector plate 25 via a lock nut 24, as shown in FIGS. 1 and 3. Further, this connector plate 25 is pivotably connected with an attaching flange 11a of the cam follower 11 via a pivot pin 26.

Between the upper ends of the arms 20, there is supported a support shaft 27 for supporting the elastic pressing roller 1 to be rotatable about the first transverse axis X1. On an upper region of the casing 3, a guide plate 28 is attached for contacting opposed axial ends of the support shaft 27 so as to guide the switching movement of the elastic pressing roller 1 between the binding position and the non-binding releasing position. To the rear face of the lower binding member 2, an elastic stopper 29 made of e.g. rubber for contacting the arms 20 when the elastic pressing roller 1 is switched over to the binding position.

Further, the connecting plate 25 includes a stopper face 25a for contacting the cam follower 11 when the elastic pressing roller 1 is switched over to the binding position.

In operation, as the electric motor 6 is driven, the eccentric cam 8 operatively connected with the output shaft 7 effects an eccentric rotation, which rotation is then converted into a fore-and-aft reciprocating movement by the cam follower 11. Thereafter, this reciprocating force is transmitted via the connector plate 25, the connector rod 23 and the elastic cylinder members 22 as a drive force to reciprocate the second bridge plate 19 back and forth. With this, the links 16 are pivoted about the second transverse axis X2 and also the the arms 20 are pivoted about the third transverse axis X3 relative to the links 16, so that the elastic pressing roller 1 attached to the upper terminal ends of the arms 20 is switched over from the non-binding releasing position upwardly and rearwardly away from the binding face of the lower binding member 2 to the binding position in pressure contact with the same or vice versa.

Accordingly, if a foreign object having a certain thickness is erroneously introduced onto the binding face of the lower binding member 2 in setting the portion (a) to be sealed of the wrapper (A), this object may be conveniently ejected forwardly in association with the movement of the elastic pressing roller 1 that approaches and comes into contact with the binding face along an oblique path from the rear and upper non-binding release position.

Figure 6:
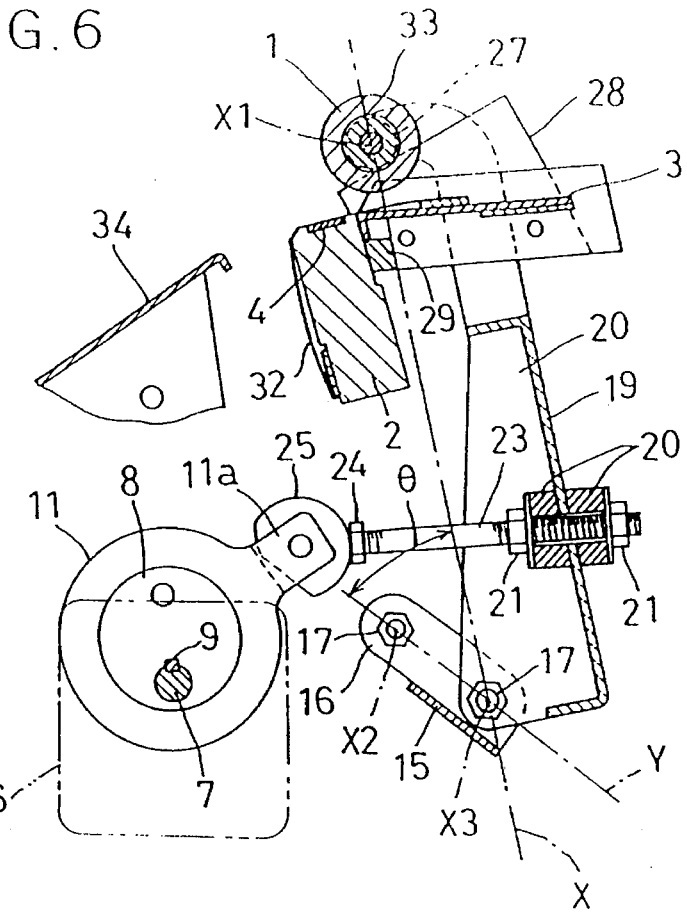
FIG. 6 is a section view showing the major portions in the course of transition from the non-binding releasing condition to a binding condition.

Further, even if the elastic pressing roller 1 fails to forwardly eject the foreign object introduced onto the binding face of the lower binding member 2 and this object remains entrapped between the roller 1 and the binding face of the lower binding member 2, as illustrated in FIG. 6, a segment (X) connecting between the first transverse axis X1 and the third transverse axis X3 and a further segment (Y) connecting between the second transverse axis X2 and the third transverse axis X3 forms an angle (θ) of 44 (forty-four) degrees approximately and also the links 16 are gently inclined, such that the horizontal vector component is greater than the vertical vector component for downwardly pressing the elastic pressing roller 1. Therefore, such foreign object entrapped between the roller 1 and the binding face of the lower binding member 2 may be readily ejected manually.

Figure 5:
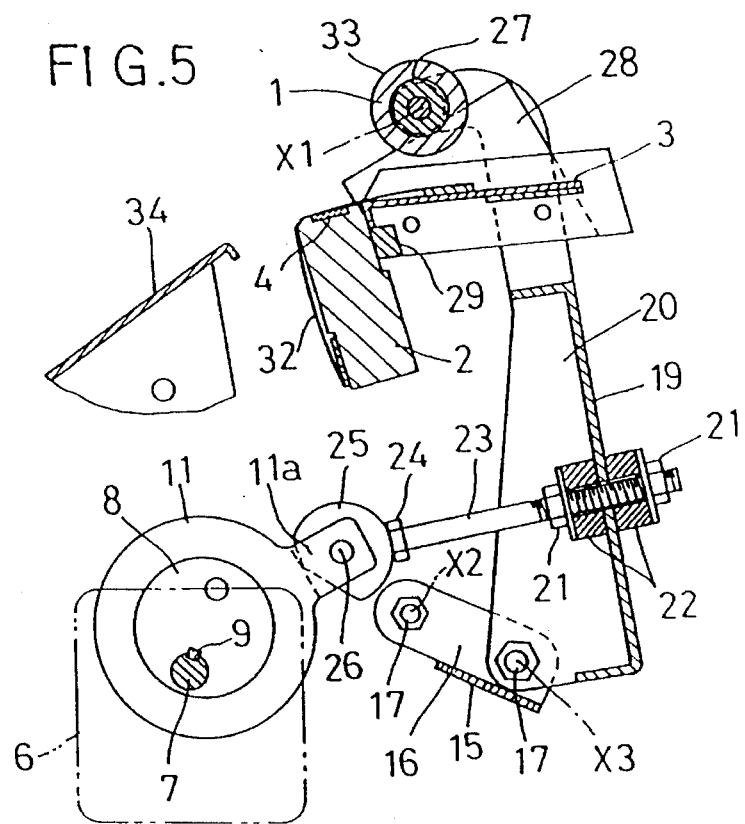
FIG. 5 is a section view showing major portions of the embodiment of FIG. 1 in a non-binding releasing condition.

Incidentally, when the elastic pressing roller 1 is located at the non-binding releasing position illustrated in FIG. 5, the afore-mentioned angle (θ) is set at 55 (fifty-five) degrees approximately. On the other hand, when the elastic pressing roller 1 is located at the binding position, the angle (θ) is set at 20 (twenty) degrees approximately.

Figure 4:
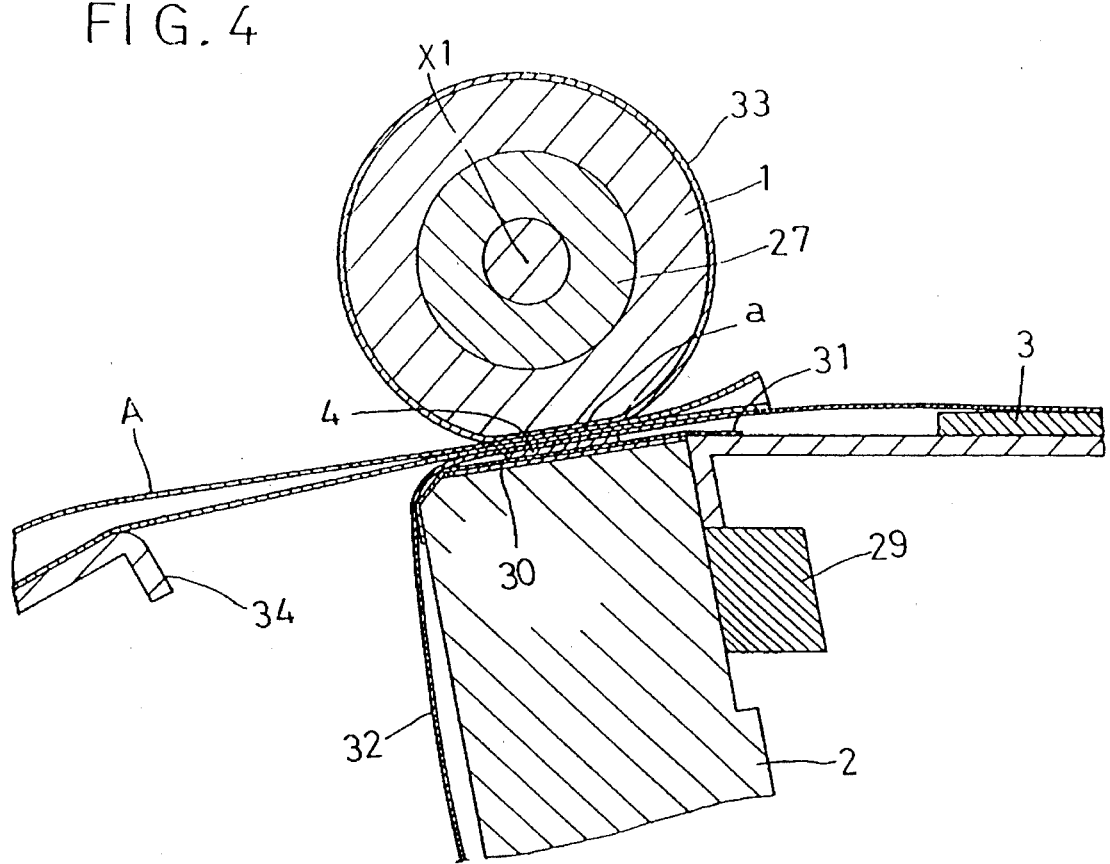
FIG. 4 is an enlarged section view of binding members relating to the embodiment of FIG. 1.

As shown in FIG. 4, between the binding face of the lower binding member 2 and the heater 4, there are interposed an insulator sheet 30 and a glass tape 31. Further, the lower binding member 2 is attached with an anti-adhesion sheet 32 made of e.g. Teflon (trademark) material covering a heat generating portion of the heater 4. The elastic pressing roller 1 too is wrapped in an anti-adhesion sheet 33 made of Teflon material.

Incidentally, a reference numeral 34 in FIG. 1 denotes a table which is vertically pivotable about a transverse axis P relative to the casing and which may be selectively fixed at any one of three positions provided within its pivotal range.

Other embodiments of the present invention will be described next.

Figure 7:
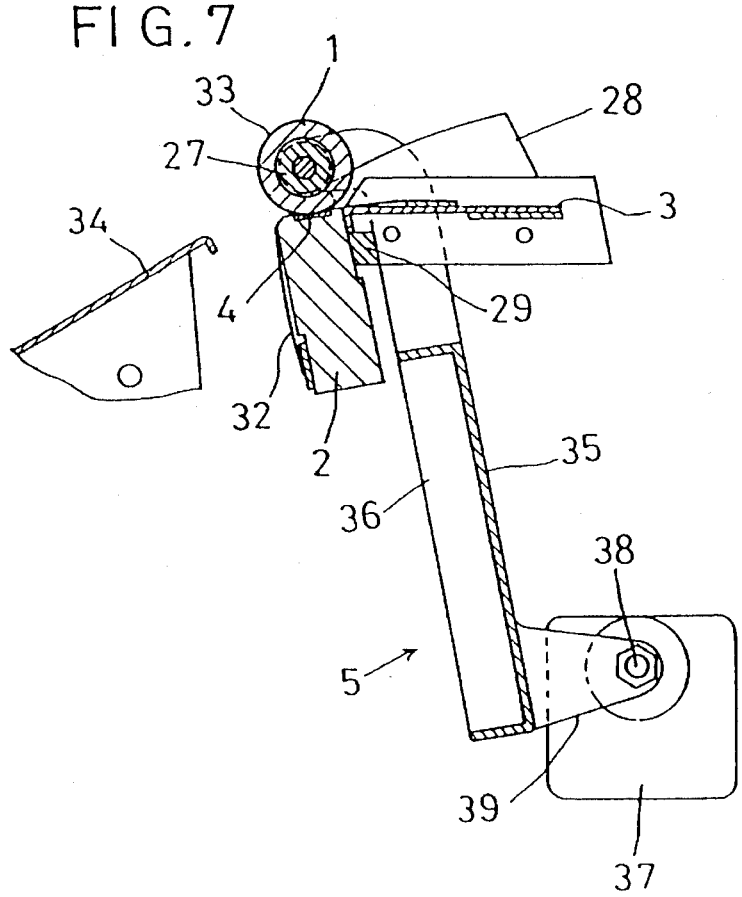
FIG. 7 is a section view showing major portions of a heat-sealing apparatus according to a further embodiment of the present invention.

FIG. 7 shows a further embodiment of the switching mechanism 5. In this mechanism, to right and left sides of a substantially 'C'-shaped bridge plate 35, there are fixed a pair of right and left arms 36 which in turn pivotably support the elastic pressing roller 1 about the transverse axis. And, to a lower rear face of the bridge plate 35, there is fixed a bracket 39 which in turn is secured to an output shaft 38 of an electric motor 37 (with a reduction mechanism) as a drive means.

Then, with the drive of the electric motor 37, the right and left arms 36 are pivoted back and forth about an axis of the output shaft 38, so that the elastic pressing roller 1 may be switched over between the binding position where the roller 1 is pressed against the binding face of the lower binding member 1 and the non-binding releasing position upwardly and rearwardly distant from the binding face of the lower binding member 2.

The other constructions of this embodiment than the switching mechanism 5 are identical to those of the foregoing embodiment. Thus, the constructions having the like functions are denoted with like reference marks and numerals and will not be described.

(1) In the above embodiments, the elastic pressing roller 1 is supported to be rotatable about the transverse axis. Instead, this pressing roller 1 may be forcibly rotated by a predetermined angle in association with an actuation of the switching mechanism 5.

(5) The construction of the switching mechanism 5 is not limited to those described in the foregoing embodiments, Any other construction is also possible as long as the construction allows the elastic pressing roller 1 to be switched over between the binding position where the roller 1 is pressed against the binding face of the lower binding member 2 and the non-binding releasing position where the roller 1 is retracted in the rear and upper direction away from the binding face.

The invention may be embodied in other specific forms without departing from the spirit or essential characteristics thereof. The present embodiments are therefore to be considered in all respects as illustrative and not restrictive, the scope of the invention being indicated by the appended claims rather than the foregoing description and all changes which come within the meaning and range of equivalency of the claims are therefore intended to be embraced therein.

What is claimed is:

1. A heat-sealing apparatus comprising:

a casing;

a pair of lower and upper binding members for vertically binding a portion of a heat-fusible wrapper therebetween;

heater means attached to a binding face of said lower binding member which is in turn fixed to said casing, said binding face defining a first plane and said heater means being operable to heat-fuse said portion of the wrapper; and a switching mechanism for switching over said upper binding member between a binding position where said upper binding member is pressed against said binding face of said lower binding member and a releasing position where said upper binding member is retracted in an upper-rear direction away from said binding face of said lower binding member;

wherein said upper binding member comprises a heat-resistant elastic pressing roller rotatable about an axis extending along a length of said heater means wherein in said binding position a second plane is defined which is perpendicular to said first plane and which includes said axis of said pressing roller and wherein in said releasing position said axis of said pressing roller is out of said second plane retracted in said upper-rear direction.

2. A heat-sealing apparatus as defined in claim 1, wherein said switching mechanism includes drive means disposed inside said casing, an eccentric cam fixedly mounted on an output shaft of said drive means for effecting an eccentric rotation about an axis of said output shaft, said axis of said output shaft being substantially parallel with said axis of said pressing roller, a cam follower rotatably mounted on an outer periphery of said eccentric cam for converting said eccentric rotation into a reciprocating movement, a connector rod connected at one end thereof with said cam follower via a connector plate, a bridge plate connected with the other end of said connector rod, said bridge plate including, at opposed sides thereof, a pair of arms which are connected at upper ends thereof with said upper binding member.

3. A heat-sealing apparatus as defined in claim 2, wherein said bridge plate and said connector rod are connected with each other via a pressure-accumulator elastic member.

4. A heat-sealing apparatus as defined in claim 1, wherein an anti-adhesion sheet is wound about an outer peripheral face of said elastic pressing roller of said upper binding member.

5. A heat-sealing apparatus as defined in claim 1, wherein an insulator sheet is interposed between the binding face of said lower binding member and said heater means, and said lower binding member is attached with an anti-adhesion sheet which covers a heat generating portion of said heater means.

6. A heat-sealing apparatus as defined in claim 5, wherein to a rear face of said lower binding member there is attached an elastic stopper for contacting said arms when said elastic pressing roller is switched over to said binding position.

7. A heat-sealing apparatus as defined in claim 1, further comprising a table which is vertically pivotable about a transverse axis relative to said casing and which may be selectively fixed at any one of a plurality of positions within a pivotal range thereof.

8. A heat-sealing apparatus as defined in claim 1, wherein said switching mechanism includes:

a pair of link members pivotably connected to said casing about a first axis, said first axis being substantially parallel with said axis of said pressing roller; and a pair of arms, each said arm pivotably connected at one end thereof to one said link member to pivot about a second axis, said second axis being substantially parallel to said axis of said pressing roller, each said arm connected to said upper binding member at one end thereof.

9. The heat-sealing apparatus of claim 8, wherein in said binding position a first line extending through said first axis and said second axis and a second line extending through said second axis and said axis of said pressing roller form an angle of about 20° and wherein in said releasing position said first and second lines form an angle of about 55°.

10. The heat-sealing apparatus as defined in claim 1, wherein said pressing roller is pivoted between said releasing position and said binding position about an axis substantially parallel to said axis of said pressing roller.

* * * * *